United States Patent [19]

Murata

[11] Patent Number: 5,739,842
[45] Date of Patent: Apr. 14, 1998

[54] IMAGE FORMING METHOD AND APPARATUS USING ROTATED SCREEN WITH PULSE WIDTH MODULATION

[75] Inventor: Kazuyuki Murata, Kyoto, Japan

[73] Assignee: Matsushita Electric Industrial Co., Ltd., Osaka, Japan

[21] Appl. No.: 807,765

[22] Filed: Feb. 27, 1997

Related U.S. Application Data

[63] Continuation of Ser. No. 505,885, Jul. 24, 1995, abandoned, which is a continuation of Ser. No. 974,293, Nov. 10, 1992, Pat. No. 5,477,257.

[30] Foreign Application Priority Data

Nov. 11, 1991 [JP] Japan ..................... 3-294131
Mar. 9, 1992 [JP] Japan ..................... 4-050102

[51] Int. Cl.[6] ............... B41J 2/47; B41J 2/385; G01D 15/14; H01N 1/21
[52] U.S. Cl. .............. 347/252; 347/247; 347/135; 347/132; 347/134; 358/298
[58] Field of Search ................... 347/135, 132, 347/134, 247, 251, 252, 131; 358/300, 296, 75, 298, 456, 518

[56] References Cited

U.S. PATENT DOCUMENTS 5,155,599  10/1992  Delabastita ............... 358/298

*Primary Examiner*—Mark J. Reinhart
*Assistant Examiner*—Raquel Yvette Gordon
*Attorney, Agent, or Firm*—McDermott, Will & Emery

[57] ABSTRACT

Image forming apparatus and method for forming half tone images by pulse width modulating multi-valued image signals comprises first and second pattern signal generators which generate pattern signals each having the same period and a phase shifted from each other, first and second pulse width modulators for pulse width modulating said image signals using the first and second pattern signals, respectively, a selector for selecting either of the first and second pulse width modulated signals and a controller for controlling the selector to obtain a screen angle of 45°.

Further, image forming apparatus and method which realizes a screen angle θ wherein tan θ is represented by a rational number.

4 Claims, 14 Drawing Sheets

IMAGE FORMING METHOD AND APPARATUS USING ROTATED SCREEN WITH PULSE WIDTH MODULATION

This is a continuation application of application Ser. No. 08/505,885, filed Jul. 24, 1995, now abandoned, which was a continuation of application Ser. No. 07/974,293, filed Nov. 10, 1992, U.S. Pat. No. 5,477,257, issued Dec. 19, 1995.

BACKGROUND OF THE INVENTION

1. Field of the Invention

The present invention relates to an image forming apparatus for forming images by digitalizing multivalued images using pulse width modulation.

2. Description of the Prior Art

Both high resolution and excellent gradation capabilities are in high demand today for both personal- and business-grade laser printers and other hard copy imaging devices. An example of a conventional image forming apparatus common today is described below with reference to FIG. 14.

FIG. 14 is a block diagram of a conventional pulse width modulation circuit used for the image forming apparatus. A D/A converter 102 converts a raster scan digital image signal 101 to an analog image signal 103. A ½ frequency divider 104 divides a pixel clock 119 of the digital image signal 101 in half, and outputs a screen clock 120. Pattern signal generator circuits 105, 106, and 107 output pattern signals 108, 109, and 110, respectively, based on the screen clock 120. The period of each of the pattern signals 108, 109, and 110 is twice the pixel clock 119, and waveforms of these signals are different from each other. The comparators 111, 112, and 113 compare the analog image signal 103 with each of the pattern signals 108, 109, and 110, and outputs pulse width modulated (PWM) signals 121, 122, and 123. A density gradient detection circuit 116 detects the density gradient of the digital image signal 101 in the main scanning direction, and outputs a density gradient detection signal 117. A selector 114 selects one of the PWM signals 121, 122, and 123 based on the density gradient detection signal 117, and outputs a PWM signal 115.

FIG. 15 is a timing chart of the conventional pulse width modulation circuit shown in FIG. 14. Digital image signal 101 is synchronized with rising edges of pixel clock 119. The frequency of screen clock 120 is one-half that of pixel clock 119. The voltage of analog image signal 103 which is converted from digital image signal 101 is low level when digital image signal 101 is white data, and it is high level when digital image signal 101 is black data. The pattern signal 108 is a ramp wave with a slope rising to the right. The pattern signal 109 is a triangular wave. The pattern signal 110 is a ramp wave with a slope descending to the right. PWM signals 121, 122 and 123 have duties corresponding to individual voltage levels of analog image signal 103. The density gradient detection circuit 116 shown in FIG. 14 detects the direction and steepness of the image signal density gradient, and determines which PWM signal is to be selected by the selector 114. PWM signal 115 is an output selected by the selector 114 according to a selector control input.

As thus described, this conventional pulse width modulation circuit is able to prevent a drop in the resolution of text images without jaggies appearing in the edge area with pulse width modulation of image signals containing text and other line images even though the pattern signal frequency is twice the pixel clock (see Japanese patent laid-open publication number H2-47973).

However, the screen pattern of the image thus formed is a linear screen with longitudinal lines, and, accordingly, the screen pattern is hard on the eyes when viewing.

Furthermore, the linear screen pattern affects differences in the tone upon forming halftone color images by overlaying at least cyan, magenta and yellow partial images since they are shifted in a different manner according to their relative positions on a print paper and, thereby, the rate of overlap among them is changed at individual positions.

In order to avoid these disadvantages due to the linear screen pattern, there has been proposed a method in which a screen processing is performed by giving a different screen angle for each color so that differences in the relative position on the paper do not affect differences in the tone.

SUMMARY OF THE INVENTION

Therefore, an object of the present invention is to provide image forming method and apparatus which use pulse width modulation, can make the screen pattern visually inconspicuous, and can apply screen processing with the forty-five (45) degree screen angle necessary when forming color images.

A further object is to provide image forming method and apparatus which use pulse width modulation and can apply the screen processing necessary when forming color images using a rational screen angle.

To achieve these objects, according to the present invention, there is provided an image forming apparatus for forming half tone images by pulse width modulating multivalued image signals comprising a first pattern signal generator for generating a first pattern signal having a period other than those corresponding to twice a pitch of a line scanning multiplied with an integer; a second pattern signal generator for generating a second pattern signal with the same period as he first pattern signal but the phase shifted 180° from the phase of the first pattern signal; a first pulse width modulation means for outputting a first pulse width modulation signal by pulse width modulating the image signal based on the first pattern signal; a second pulse width modulation means for outputting a second pulse width modulation signal by pulse width modulating the image signal based on the second pattern signal; a selector for selecting either of the first and second pulse width modulation signals; and a selector control means for controlling the selection by the selector for each scan line, wherein an image is formed at a screen pitch equal to an inverse of a root of the period of the selected pattern signal and a 45° pseudo-screen angle.

According to one aspect of the present invention, an image forming apparatus comprises a clock signal generator for generating a first clock signal with a predetermined frequency, and a second clock signal with the same frequency as the first clock signal and a phase shifted 180° from the phase of the first clock signal; a selector for selecting and outputting either the first or the second clock signal; a pattern signal generator for generating a pattern signal based on the clock signal output from the selector; a pulse width modulation means for pulse width modulating the image signal based on the pattern signal and outputting a pulse width modulation signal; and a selector control means for controlling the selection made by the selector for each scan line, wherein an image is formed at a screen pitch equal to an inverse of a root of the predetermined period and a 45° pseudo-screen angle.

According to another aspect of the present invention, an image forming apparatus comprises a pattern signal generator for generating three or more pattern signals, each having the same predetermined frequency and a different phase; a plurality of pulse width modulation means for pulse width modulating the image signal based on the three or more pattern signals and outputting three or more pulse width modulation signals; a selector for selecting and outputting one of the three or more pulse width modulation signals; and a selector control means for controlling the selection made by the selector for each scan line, wherein an image is formed so as to have a screen angle θ where tan θ is a rational number.

According to a further aspect of the present invention, an image forming apparatus comprises a clock generator for generating three or more clock signals, each having the same predetermined frequency and a different phase; a selector for selecting and outputting one of the three or more clock signals; a pattern signal generator for generating a pattern signal based on the selector output; a pulse width modulation means for pulse width modulating the an image signal based on the pattern signal and outputting a pulse width modulation signal; and a selector control means for controlling the selection made by the selector for each scan line, wherein an image is formed so as to have a screen angle θ where tan θ is a rational number.

The screen used to display an image thus formed can be made visually inconspicuous by means of the present invention because screen processing is possible at a 45° pseudscreen angle and desired screen pitch.

In addition, screen processing at any desired frequency or period and at the 45° screen angle required for color imaging is also possible.

Furthermore, because screen processing at a screen angle of θ degrees where tan θ is a rational number is also possible, the screen processing required for color imaging can also be performed.

BRIEF DESCRIPTION OF THE DRAWINGS

The present invention will become more fully understood from the detailed description given below and the accompanying diagrams wherein.

DESCRIPTION OF PREFERRED EMBODIMENT

Figure 1:
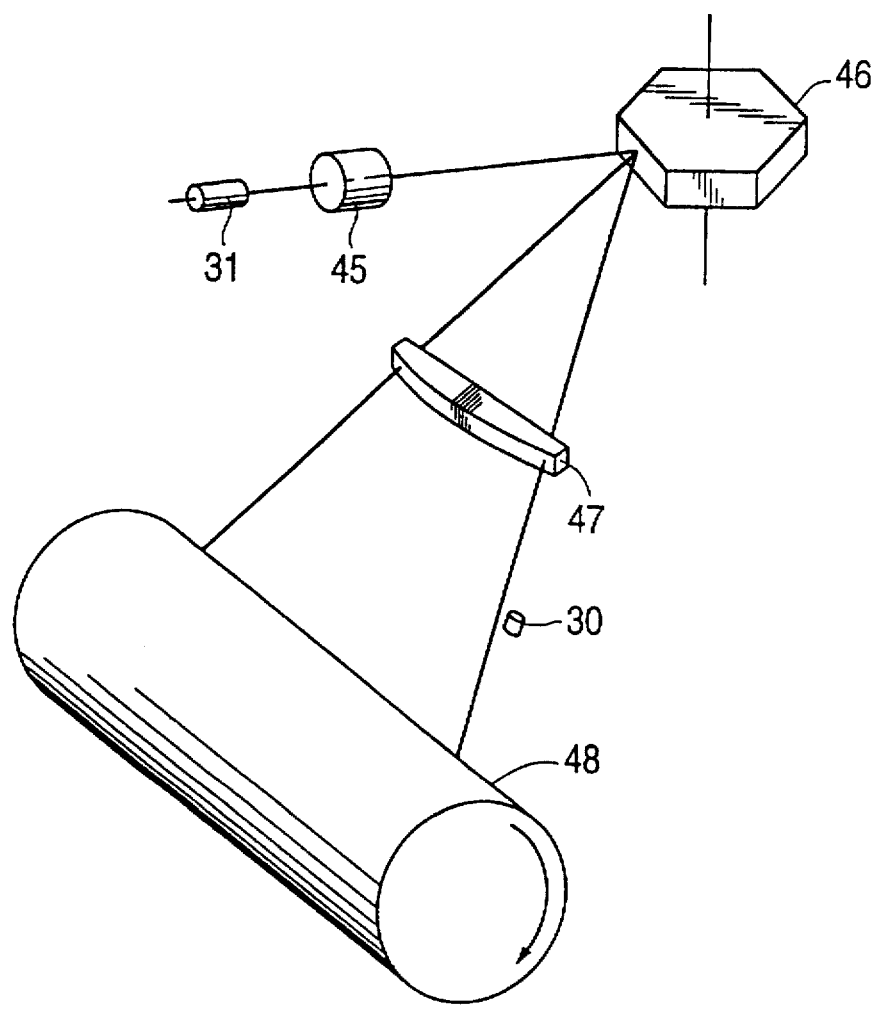
FIG. 1 is a simplified diagram of the recording section of a laser printer, which is one type of image forming apparatus according to the present invention.

The preferred embodiments of the present invention are described hereinbelow with reference to the accompanying figures, of which FIG. 1 is a simplified diagram of the recording section of a laser printer, which is one type of image forming apparatus according to the present invention.

Referring to FIG. 1, the pulse width modulated laser beam emitted from a semiconductor laser 31 is collimated by a collimator lens 45. The laser beam is then reflected by a rotating polygonal mirror 46, f/θ corrected by a f/θ lens 47, and thus scans a photoconductive drum 48. The photoconductive drum 48 rotates clockwise as indicated by an arrow in FIG. 1, thus forming an electrostatic latent image on the photoconductive drum 48. The image represented by this electrostatic latent image on the photoconductive drum 48 is then formed on a print paper by a well-known electrophotographic method. A pin photodiode 30 is provided near the point where each laser beam scan line starts to detect the line scanning timing of the laser beam.

Figure 2:
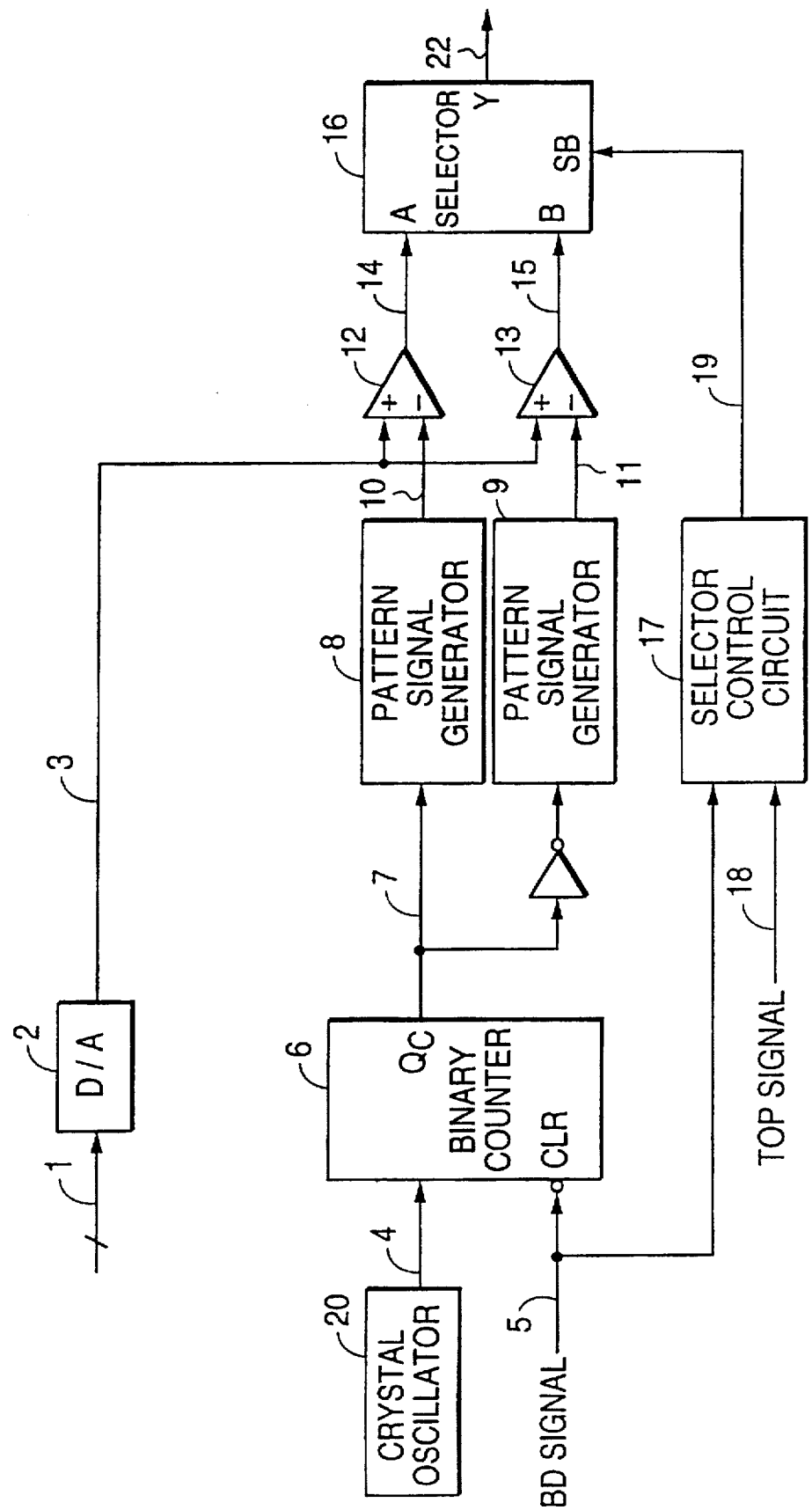
FIG. 2 is a block diagram of the image signal processing section of a laser printer according to a first embodiment of an image forming apparatus according to the present invention.

FIG. 2 is a block diagram of the image signal processing section of a laser printer according to a first embodiment of an image forming apparatus according to the present invention.

Referring to FIG. 2, an 8-bit digital image signal 1 is converted to an analog image signal 3 by a D/A converter 2. The pixel rate of the digital image signal 1 is 20 MHz. A crystal oscillator 20 outputs a 56.5685-MHz rectangular wave 4. An active LOW beam detect (BD) signal 5 is input to an asynchronous clear (CLR) input of a binary counter 6. The beam detect signal 5 is the wave-shaped signal output from the photodiode 30 shown in FIG. 1, and is output at each laser beam scan.

A rectangular wave 4 is input to the binary counter 6 clock input. The binary counter 6⅛-frequency divides the rectangular wave 4 to generate a pattern clock 7, which it then outputs from the output terminal QC thereof.

The pattern clock 7 is a rectangular wave synchronized to the beam detect signal 5, and has a frequency of 7.0711 MHz. The pattern clock 7 is input directly to a first pattern signal generator 8, and is input through an inverter 21 to a second pattern signal generator 9. The pattern signal generators 8 and 9 generate triangular waves 10 and 11 based on the respectively input rectangular waves.

The triangular waves 10 and 11 have the same frequency as the pattern clock 7, but the phase of the triangular waves 10 and 11 is offset by 180°. Because the pixel rate of the digital image signal 1 is 20 MHz, the frequency of the triangular waves 10 and 11 corresponds to 2.8284 pixels.

A comparator 12 compares the analog image signal 3 with one triangular wave 10, and outputs a HIGH pulse width modulation signal 14 when the analog image signal 3 is greater than the triangular wave 10. The other comparator 13 compares the analog image signal 3 with the other triangular wave 11, and likewise outputs a HIGH pulse width modulation signal 15 when the analog image signal 3 is greater than the triangular wave 11.

Both pulse width modulation signals 14 and 15 are input to a selector 16. When a select signal 19 is HIGH, the pulse width modulation signal 15 is selected and a laser modulation signal 22 is output. When the select signal 19 is LOW, the other pulse width modulation signal 14 is selected and the laser modulation signal 22 is output. The laser modulation signal 22 is input to the laser drive circuit, which is not shown in the figures but well known to those in the art. The laser drive circuit drives the semiconductor laser when the laser modulation signal 22 is HIGH.

The beam detect signal 5 and TOP signal 18, which identifies the top of a single plane of image, are input to the selector control circuit 17, which outputs the select signal 19. The TOP signal 18 is an active LOW pulse signal. The operation of the selector control circuit 17 is described in greater detail below.

Figure 3:
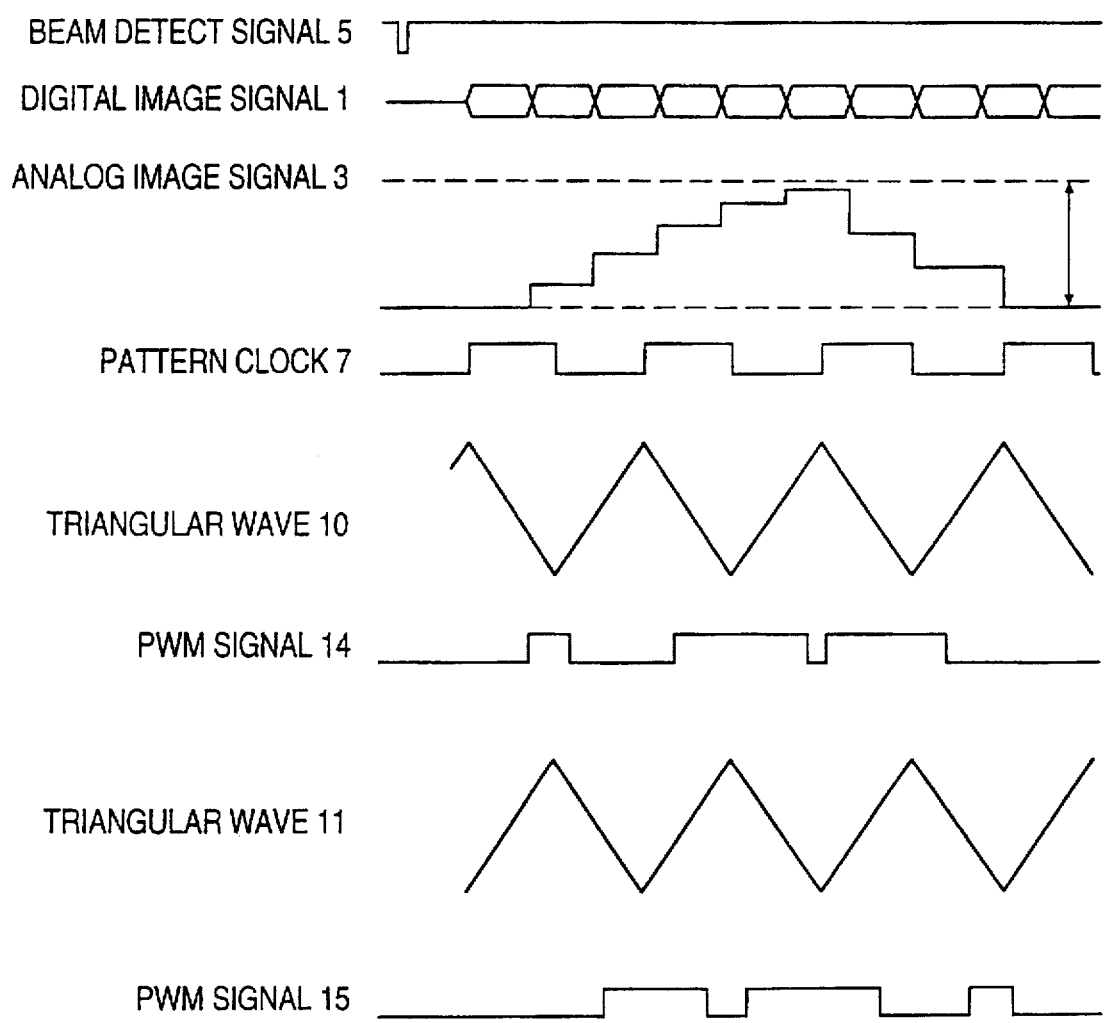
FIG. 3 is a timing chart of the image signal processing section shown in FIG. 2.

FIG. 3 is a timing chart of the image signal processing section shown in FIG. 2. The operation of the image signal processing section shown in FIG. 2 is described below with reference to this timing chart.

The beam detect signal 5 is a LOW pulse line synchronization signal output at each laser beam scan. The digital image signal 1 is synchronized to the beam detect signal 5. The pixel rate of the 8-bit digital image signal is 20 MHz, which means that each 50 nsec corresponds to one pixel. The analog image signal 3 is an analog signal resulting from digital/analog conversion of the digital image signal 1 by the D/A converter 2. A high signal potential corresponds to black, and a low potential to white. The pattern clock 7 frequency corresponds to 2.8284 pixels.

The triangular waves 10 and 11 are synchronized to the pattern clock 7. The phases of the two triangular waves are shifted 180° relative to the other. The pulse width modulation signal 14 is HIGH when the analog image signal 3 potential is greater than the triangular wave 10 potential. Similarly, the pulse width modulation signal 15 is HIGH when the analog image signal 3 is greater than the triangular wave 11.

Figure 4:
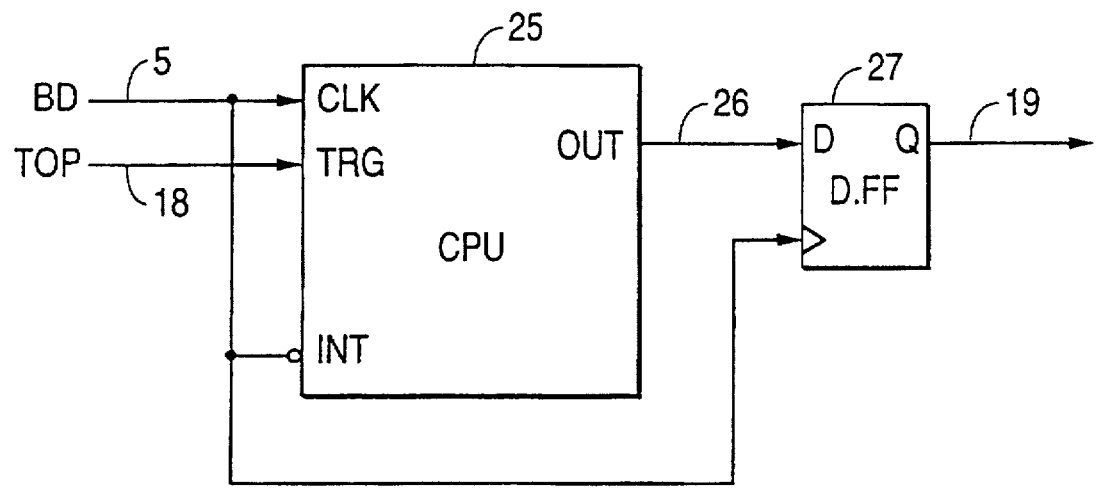
FIG. 4 is a block diagram of the selector circuit 17 shown in FIG. 2.

FIG. 4 is a block diagram of the selector circuit 17 shown in FIG. 2. The single-chip microprocessor (CPU) 25 contains both a programmable counter and output port. The beam detect signal 5 is input to the interrupt input terminal and the programmable counter clock input terminal of the CPU 25. The TOP signal 18, which indicates the top of a single plane of image, is input to the trigger input terminal of the programmable counter in the CPU 25.

The programmable counter is reset to 0 based on the trigger input, and counts up (increments) according to the beam detect signal 5. The CPU 25 performs an interrupt process according to the beam detect signal 5.

This interrupt process is described below.

The CPU 25 reads the current line value (count n) of the programmable count, and computes the equation $RND(2 \times n/a) MOD 2$ where a is the pixel equivalent of the period of each of the triangular waves 10 and 11 (a=2.8284 in the present embodiment). RND is a rounding function for the decimal part, and MOD is a residue operator. The result is either 0 or 1. Based on the result, the CPU 25 sets the output port to either a HIGH or LOW level. The output signal 26 from the CPU 25 is LOW when the computed result is 0, and HIGH when 1.

According to the above algorithm, it enables to obtain desirable screen pitch and angle as follows.

If the period of the triangular wave is equal to 2 pixels (a=2), a screen processing with a screen pitch of $\sqrt{2}$ pixels and a screen angle of 45° can be done by shifting the phase of the triangular wave for every one line by 180°. Also, if a=4, it is possible to obtain a screen processing with a screen pitch of $2\sqrt{2}$ pixels and a screen angle of 45° by shifting the phase of the triangular wave for every two lines by 180°. Generally, if a=2×m pixels (m is an integer), it is possible to obtain a screen processing with a screen pitch of $m\sqrt{2}$ a screen angle of 45° by shifting the phase of the triangular wave for every m lines by 180°. However, if the period of the triangular wave is not equal to 2×m pixels (a≠2 m pixels), namely, the screen pitch is other than $m\sqrt{2}$ pixels, it is impossible to realize a screen processing with a screen angle of 45° even by shifting the phase of the triangular wave for every predetermined number of lines by 180°.

The present preferred embodiment of this invention solves the above problem by introducing a round off calculation [RND (2×n/a)]. This enables to determine whether or not the phase of the triangular wave has to be shifted by 180°, approximately. Thus, a screen processing with an arbitrary screen pitch and a screen angle of 45° can be realized artificially.

Again, returning to FIG. 4, the beam detect signal 5 is input to the clock input of a D flip-flop 27. The CPU 25 output signal 26 is input to the D flip-flop 27 D input. A select signal 19, which is a Q output signal from the D flip-flop 27, is a signal obtained by synchronizing the D input signal 26 to the beam detect signal 5.

The values obtained by the CPU 25 for the computations based on a given counter value n are shown in Table 1 below.

TABLE 1

| n | Result |
|---|---|
| 1 | 1 |
| 2 | 1 |
| 3 | 0 |
| 4 | 1 |
| 5 | 0 |
| 6 | 0 |
| 7 | 1 |
| 8 | 0 |
| 9 | 0 |
| 10 | 1 |
| 11 | 0 |
| 12 | 0 |
| ... | ... |

Figure 5:
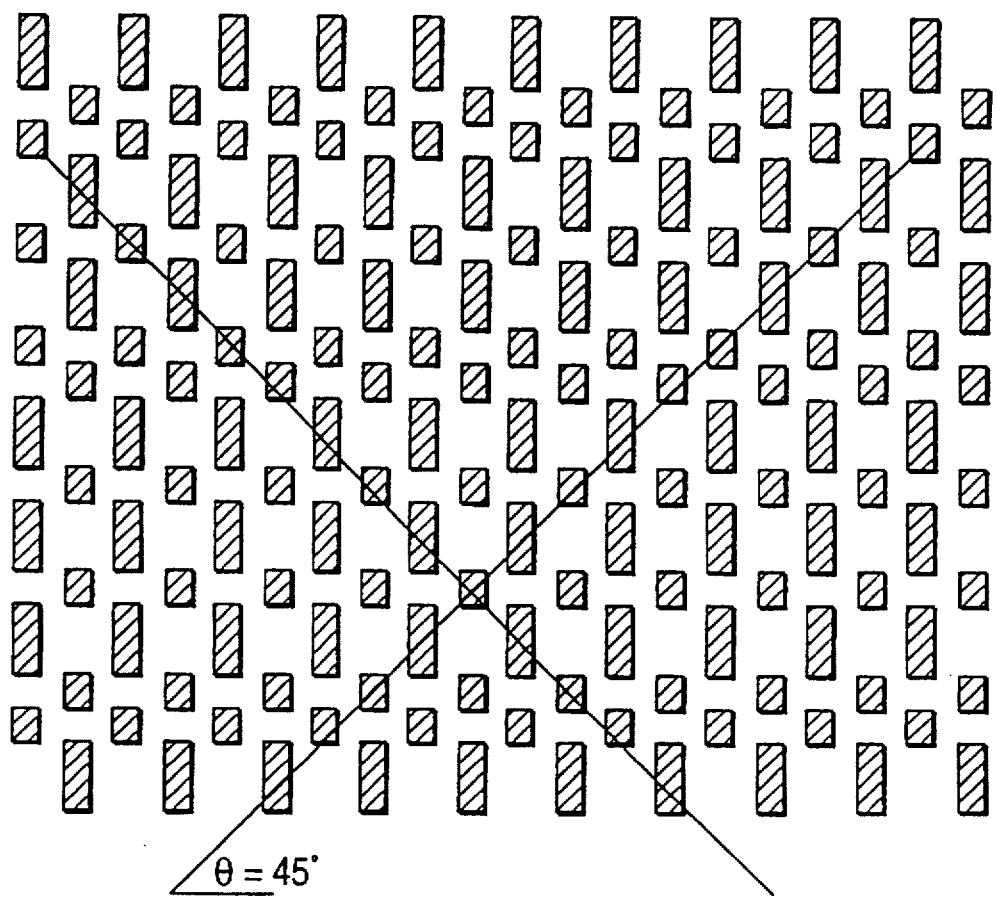
FIG. 5 is an illustration of the formed image when the value of all digital image signals 1 in the first embodiment of the invention is 64.

The image formed when the value of all digital image signals 1 in the first embodiment of the invention is 64 is shown in FIG. 5. As will be known from FIG. 5, the average screen angle is 45°, and the average screen pitch is one over the square root of the triangular wave period.

As described hereinabove, screen processing with a 45° screen angle and any desired pitch is possible by choosing the triangular wave frequency suitably.

It is to be noted that the CPU 25 used in this embodiment may also execute operation other than the calculation described above, including laser printer sequence control. The pattern signal may also be a ramp signal rather than the triangular wave of the present embodiment.

Figure 6:
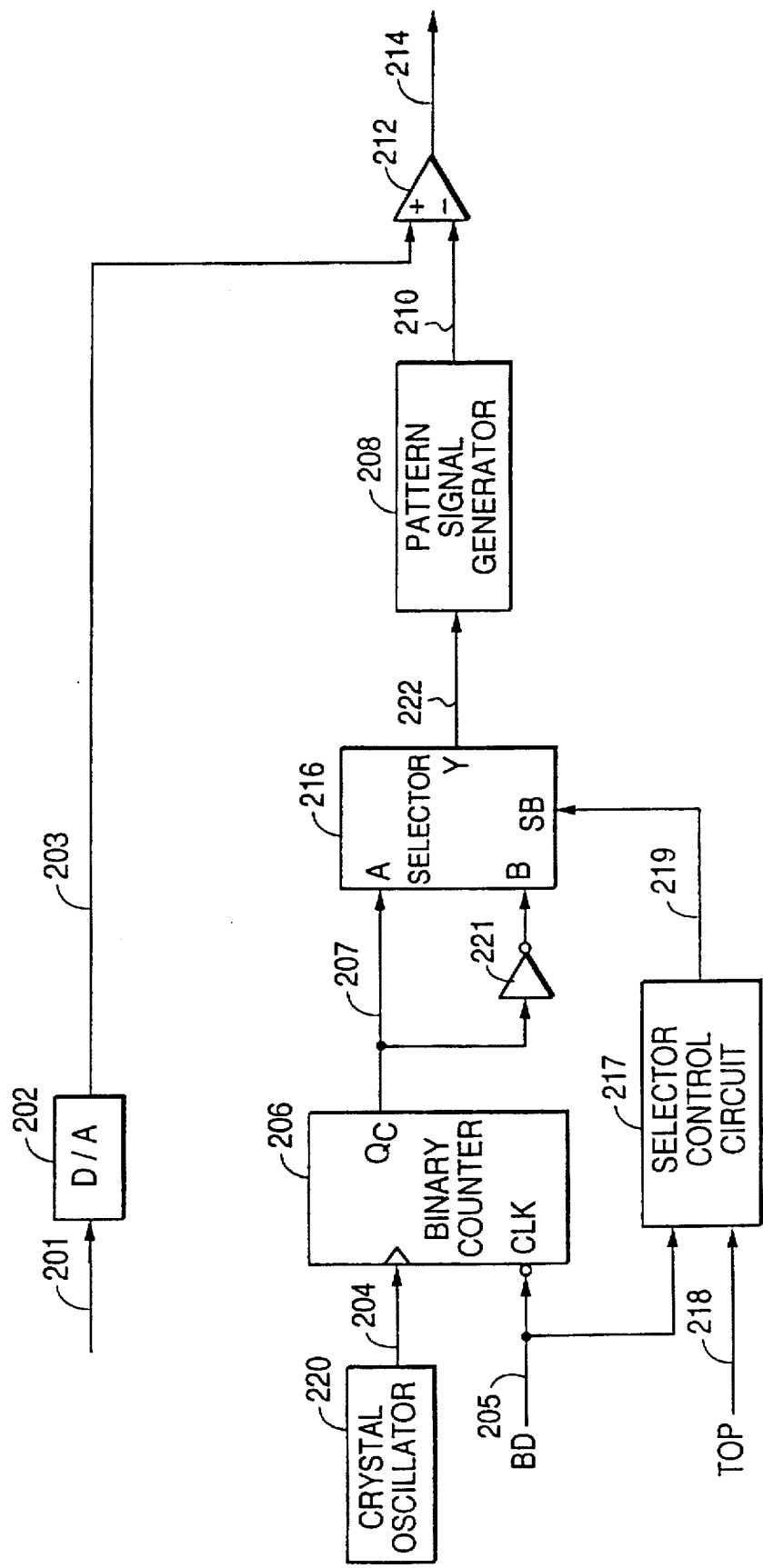
FIG. 6 is a block diagram of the image signal processing section of a laser printer according to a second embodiment of an image forming apparatus according to the present invention.

FIG. 6 is a block diagram of the image signal processing section of a laser printer according to a second embodiment of an image forming apparatus according to the present invention.

Referring to FIG. 6, an 8-bit digital image signal 201 is converted to an analog image signal 203 by a D/A converter 202. The pixel rate of the digital image signal 201 is 20 MHz. The crystal oscillator 220 outputs a 64-MHz rectangular wave 204. An active LOW beam detect (BD) signal 205 is input to an asynchronous clear (CLR) input of a binary counter 206. The beam detect signal 205 is the wave-shaped signal output from the photodiode 30 shown in FIG. 1, and is output at each laser beam scan.

The rectangular wave 204 is input to the binary counter 206 clock input. The binary counter 206 ⅛-frequency divides the rectangular wave 204 to generate a pattern clock 207, which it then outputs from an output terminal QC thereof.

The pattern clock 207 is an 8-MHz rectangular wave synchronized to the beam detect signal 205, and is input directly and through an inverter 221 to a selector 216.

When a select signal 219 is LOW, the selector 216 selects and outputs the pattern clock 207. A pattern signal generator 208 generates a triangular wave 210 based on a rectangular wave 222 output from the selector 216. The triangular wave 210 has the same frequency as the pattern clock 207 with a phase shift of 180° depending on which input is selected by the selector 216. Because the pixel rate is 20 MHz, each triangular wave 210 period corresponds to 2.5 pixels.

A comparator 212 compares the analog image signal 203 with one triangular wave 210, and outputs a HIGH pulse width modulation signal 214 when the analog image signal 203 is greater than the triangular wave 210. The laser modulation signal 214 is input to the laser drive circuit (not shown in the figures). The laser drive circuit drives the semiconductor laser when the laser modulation signal 214 is HIGH.

The beam detect signal 205 and TOP signal 218 indicating the top of one image, are input to the selector control circuit 217, which outputs the select signal 219. The TOP signal 218 is an active LOW pulse signal. The operation of the selector control circuit 217 is described in greater detail below.

As in the first embodiment described above, the CPU computes the equation $RND(2 \times n/a)MOD2$ where n is a current scan line of the image being processed, a is the pixel equivalent of the triangular wave 210 period (a=2.5 in the present embodiment), RND is a rounding function for the decimal part, and MOD is a residue operator.

The values returned for the computation based on a given counter value n are shown in Table 2 below.

TABLE 2

| n | Result |
| --- | --- |
| 1 | 1 |
| 2 | 0 |
| 3 | 0 |
| 4 | 1 |
| 5 | 0 |
| 6 | 1 |
| 7 | 0 |
| 8 | 0 |
| 9 | 1 |
| 10 | 0 |
| ... | ... |

As shown in Table 2, the calculated result is repeated every five scan lines. In general, when a is a rational number, the calculated result is repeated on a regular cycle of scan lines.

Figure 7:
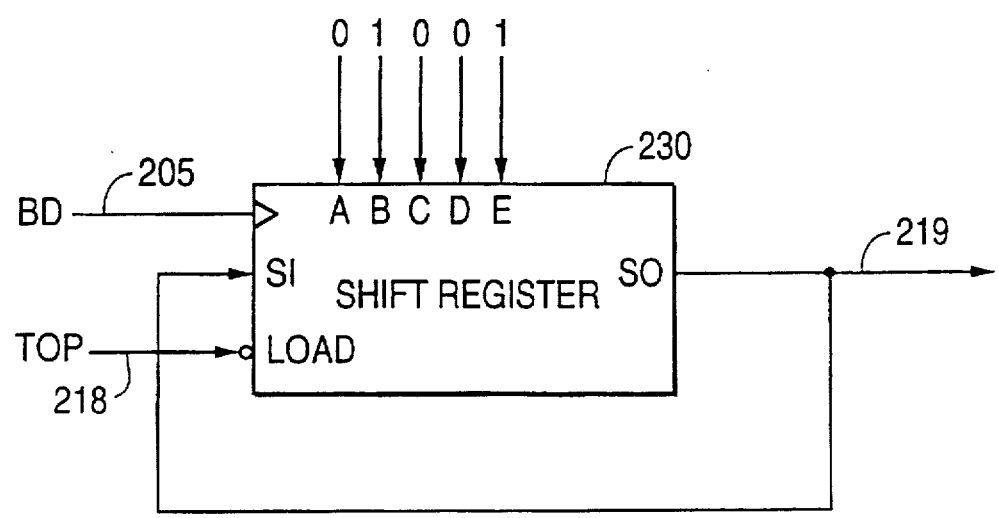
FIG. 7 is a block diagram of the selector control circuit 217 shown in FIG. 6.

FIG. 7 is a block diagram of the selector control circuit 217. A 5-bit shift register 230 has a parallel load function, and sets a parallel data A–E to the internal flip-flop asynchronously to the clock input when the LOAD input level is LOW. The parallel load data ABCDE of the shift register 230 is set to 01001. BD signal 205 is input to the shift register 230 clock input. The select signal 219 output from one serial output port of the shift register 230 is input to another input port of the shift register 230 in a feedback loop.

With this construction, the select signal 219 varies as shown in Table 2 with the beam detect (BD) signal 205. It is to be noted that the selector control circuit shown in FIG. 7 may be formed by a memory device and a quinary counter that generates the memory address.

Figure 8:
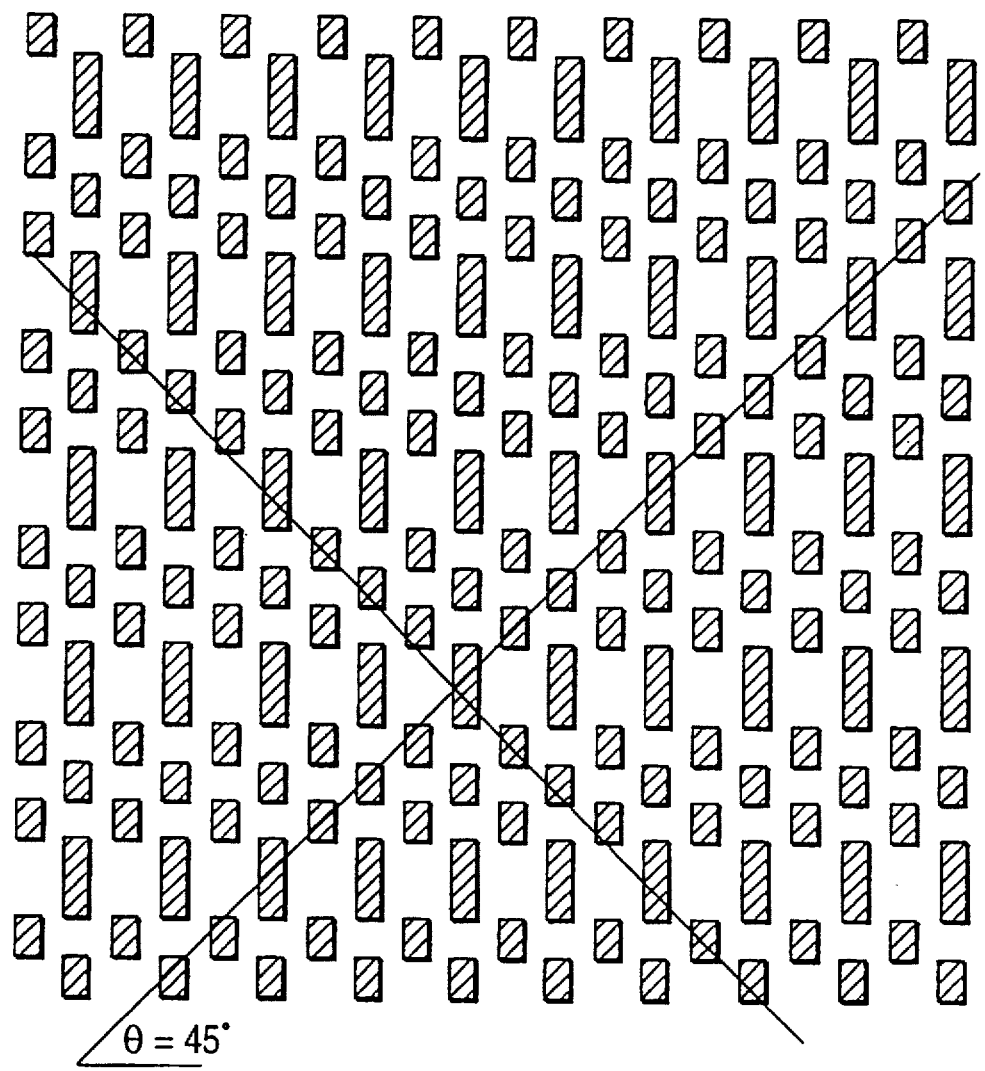
FIG. 8 is an illustration of the formed image when the value of all digital image signals 201 in the second embodiment of the invention is 64.

The image formed when the value of all digital image signals 201 in the second embodiment of the invention is 64 is shown in FIG. 8. As will be known from FIG. 8, the average screen angle is 45°, and the average screen pitch is one over the square root of the triangular wave period.

As described hereinabove, screen processing with a 45° screen angle and any desired pitch is possible by controlling the triangular wave frequency according to this second embodiment.

As thus described, this second embodiment of an image forming apparatus can make the imaging screen visually inconspicuous with a 45° screen angle, and can apply the 45° screen angle screen processing required for color imaging at any desired screen pitch.

Figure 9:
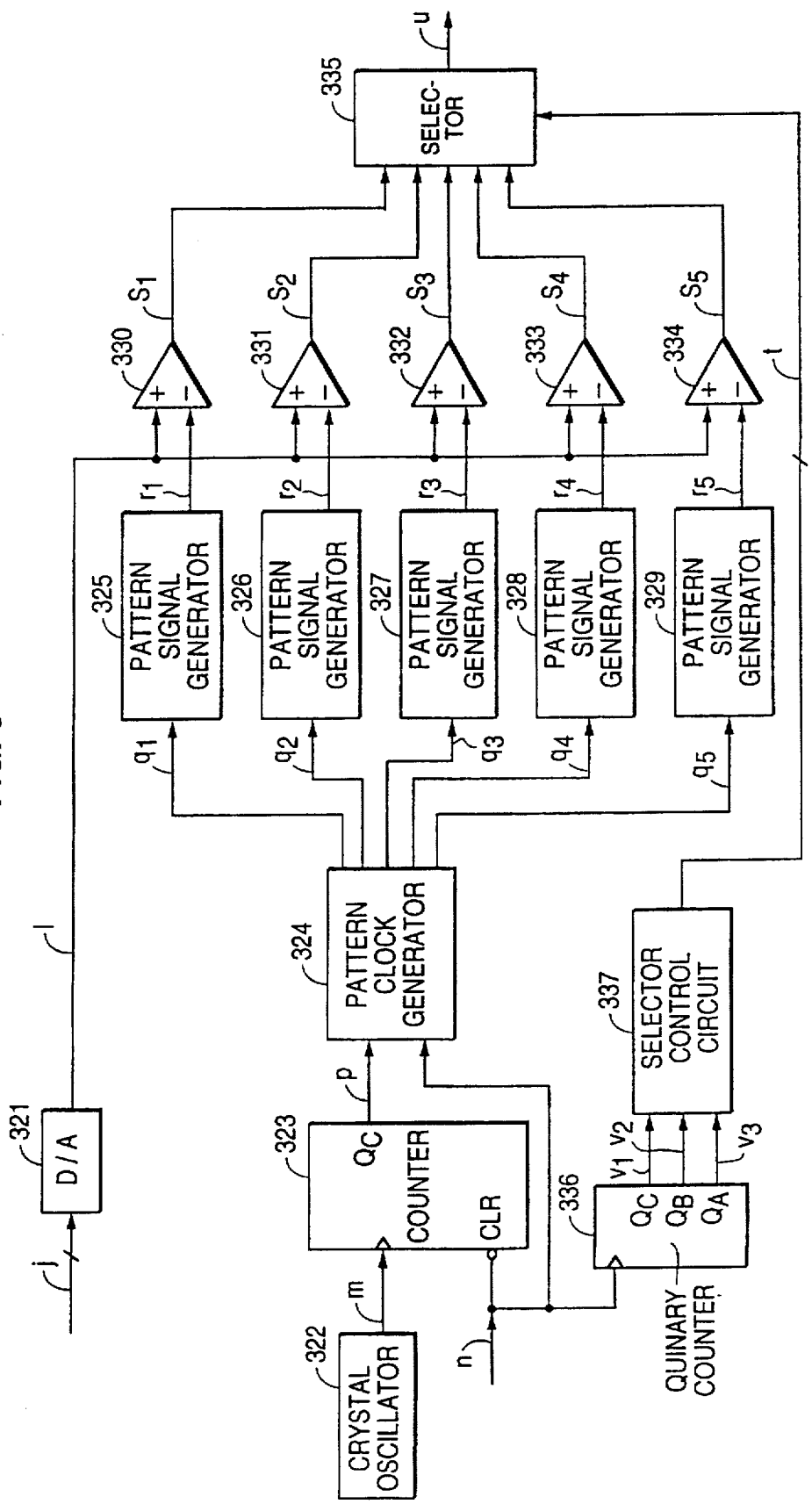
FIG. 9 is a block diagram of the image signal processing section of a laser printer according to a third embodiment of an image forming apparatus according to the present invention.

FIG. 9 is a block diagram of the image signal processing section of a laser printer according to a third embodiment of an image forming apparatus according to the present invention.

Referring to FIG. 9, an 8-bit digital image signal j is converted to an analog image signal 1 by a D/A converter 321. The pixel rate of the digital image signal j is 5 MHz. A crystal oscillator 322 outputs an 80-MHz rectangular wave m. An active LOW beam detect (BD) signal n is input to an asynchronous clear (CLR) input of a binary counter 323. A beam detect signal n is the wave-shaped signal output from the photodiode 30 shown in FIG. 1, and is output at each laser beam scan.

The rectangular wave m is input to a clock input of the binary counter 323. The binary counter 323 ⅛-frequency divides the rectangular wave m to generate a clock p, which it then outputs from an output terminal QC thereof.

The clock p is a 10-MHz rectangular wave synchronized to the beam detect signal n, and is input to a pattern clock generator 324.

The pattern clock generator 324 outputs plural pattern clocks q1–q5 with a 1-MHz frequency based on the clock p. The phase of each pattern clock is shifted by 144°. The pattern clock period corresponds to 5 pixels. The phase of the pattern clock q2 is delayed 144° relative to the pattern clock q1 phase. Similarly, the pattern clock q3 is delayed 144° relative to the pattern clock q2, the pattern clock q4 to the pattern clock q3, and the pattern clock q5 to the pattern clock q4. A pattern clock generator 324 uses the beam detect signal n to synchronize the pattern clocks q1–q5 to the beam detect signal.

The pattern clocks q1–q5 are input to the pattern signal generators 325–329, respectively, which then output triangular waves r1–r5 based on and with the same frequency as the respective pattern clock.

Comparators 330–334 compare the analog image signal 1 with the triangular waves r1–r5, and output a HIGH pulse width modulation signal s1–s5 when the analog image signal 1 is greater than the respective triangular wave. The pulse width modulation signals s1–s5 are input to the selector 335, which selects one of the input pulse width modulation signals based on the selector control signal t, and outputs the laser modulation signal u. The laser modulation signal u is input to a laser drive circuit, which is not shown in the figures. When the laser modulation signal u is HIGH, the laser drive circuit drives the semiconductor laser.

A quinary counter 336 counts the beam detect signal n, and outputs a value from 0–4 over output buses v1–v3 to a selector control circuit 337. Based on the v1–v3 values input from the quinary counter 336, the selector control circuit 337 outputs a selector control signal t causing the selector 335 to output the appropriate pulse width modulation signal. The pulse width modulation signals s1–s5 selected by the selector 335 for the quinary counter 336 output values v1–v3 are shown in Table 3 below.

TABLE 3

| Counter value | Selected signal |
| --- | --- |
| 0 | S1 |
| 1 | S2 |
| 2 | S3 |
| 3 | S4 |
| 4 | S5 |

Figure 10:
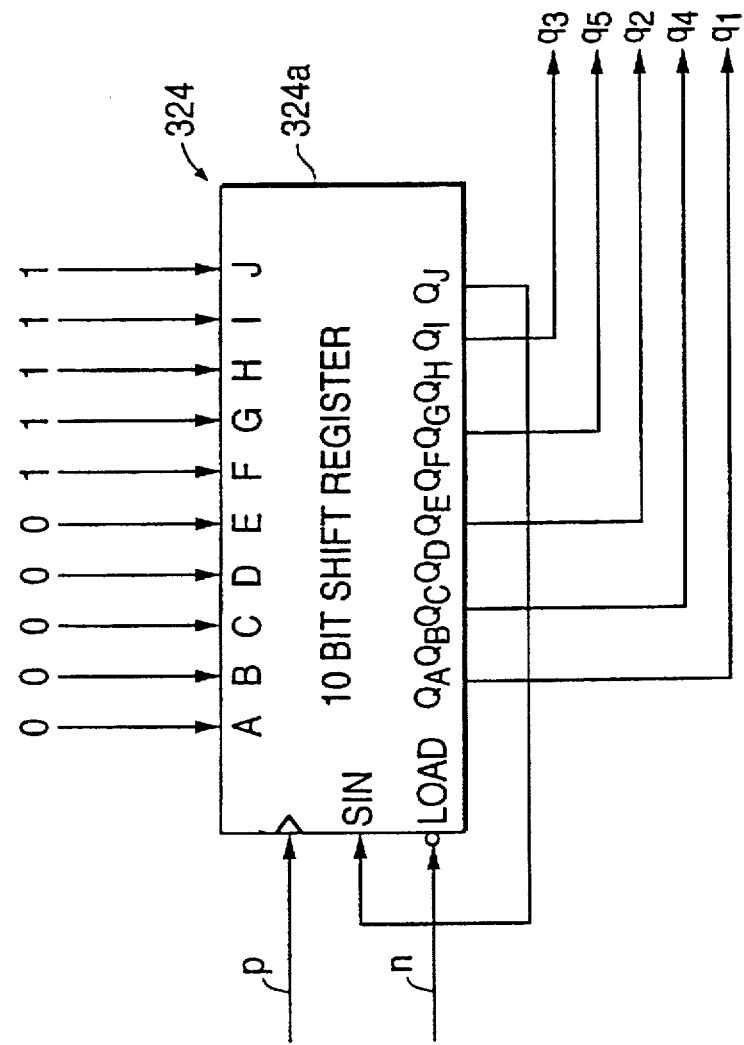
FIG. 10 is a signal diagram of the pattern clock generator 324 shown in FIG. 9.

FIG. 10 is a block diagram of the pattern clock generator 324 shown in FIG. 9.

Referring to FIG. 10, a serial-in, parallel-out shift register 324a has a parallel load function. A value [0000011111] is set in the parallel load input of the shift register 324a, and parallel loading occurs when the beam detect signal n is ACTIVE. The last output of the shift register 324a is input back through the serial input terminal.

The output p of the 10-MHz counter 323 is input to the shift clock input of the shift register 324a. The first output of the shift register 324a is output as pattern clock q1. Similarly, the fifth output is output as pattern clock q2, the ninth output as pattern clock q3, the third output as pattern clock q4, and the seventh output as pattern clock q5.

The pattern clocks q1–q5 are rectangular waves with a 1-MHz frequency. The phase of each pattern clock is shifted by 144°.

Figure 11:
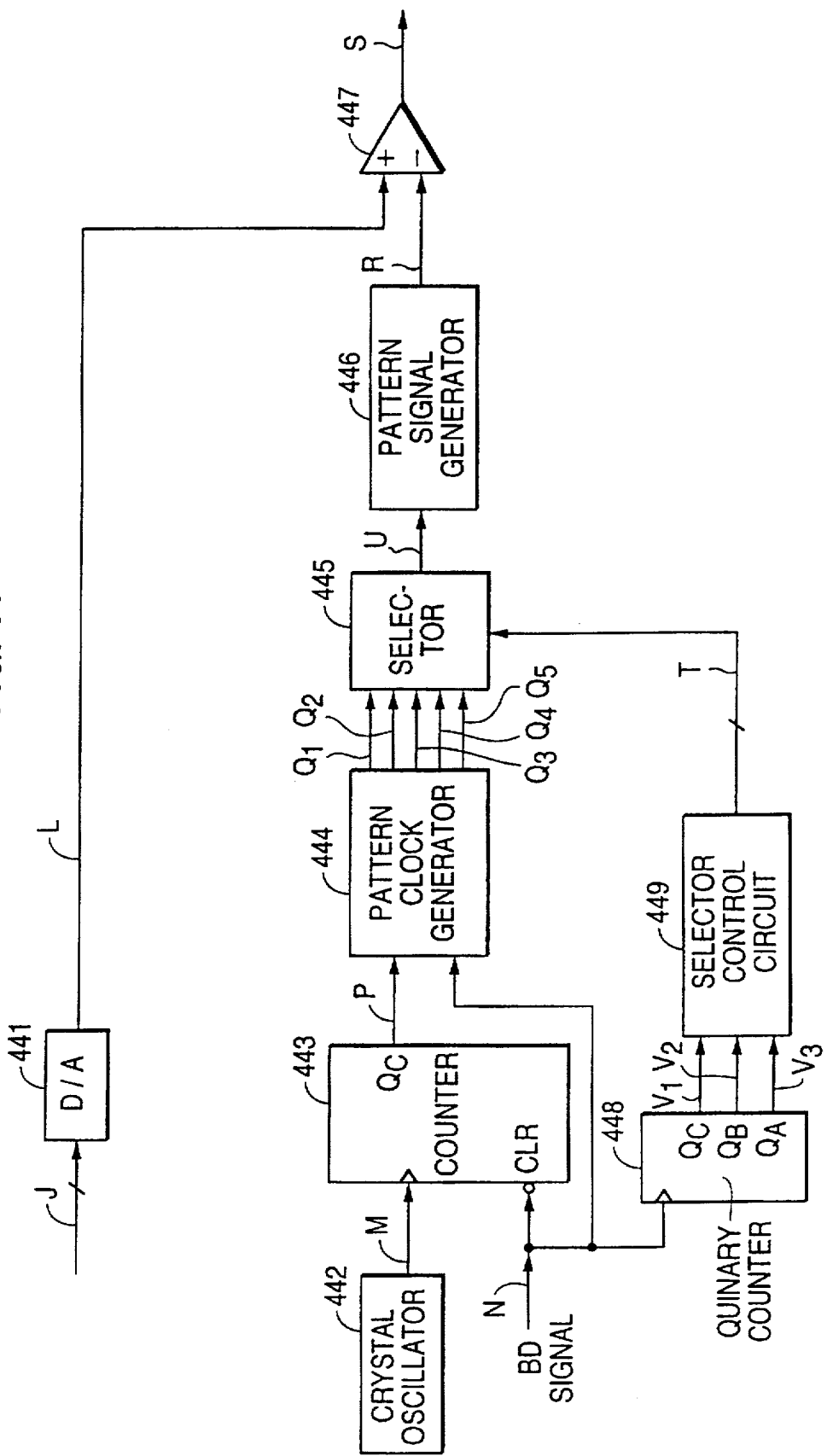
FIG. 11 is a block diagram of the image signal processing section of a laser printer according to a fourth embodiment of an image forming apparatus according to the present invention.

FIG. 11 is a block diagram of the image signal processing section of a laser printer according to a fourth embodiment of an image forming apparatus according to the present invention.

Referring to FIG. 11, an 8-bit digital image signal J is converted to an analog image signal L by a D/A converter 441. The pixel rate of the digital image signal J is 5 MHz. A crystal oscillator 442 outputs an 80-MHz rectangular wave M. An active LOW beam detect (BD) beam detect signal N is input to an asynchronous clear (CLR) input of a binary counter 443. The beam detect signal N is the wave-shaped signal output from the photodiode 30 shown in FIG. 1, and is output at each laser beam scan.

The rectangular wave M is input to the binary counter 443 clock input. The binary counter 443 ⅛-frequency divides the rectangular wave M to generate a clock signal P, which it then outputs from the output terminal QC thereof.

The clock P is a 10-MHz rectangular wave synchronized to the beam detect signal N, and is input to a pattern clock generator 444. The pattern clock generator 444 is the same as the pattern clock generator 324 of the third embodiment described above.

The pattern clock generator 444 outputs plural pattern clocks Q1–Q5 with a 1-MHz frequency based on the clock P. The phase of each pattern clock is shifted by 144°. The pattern clock frequency corresponds to 5 pixels. The phase of pattern clock Q2 is delayed by 144° relative to the pattern clock Q1 phase. Similarly, pattern clock Q3 is delayed 144° relative to pattern clock Q2, pattern clock Q4 to pattern clock Q3, and pattern clock Q5 to pattern clock Q4. The pattern clock generator 444 uses the beam detect signal N to synchronize the pattern clocks Q1–Q5 to the beam detect signal N.

The pattern clocks Q1–Q5 are input to a selector 445, which selects one of the input pattern clocks based on a selector control signal T, and outputs a pattern clock U. Based on the selected pattern clock U, a pattern signal generator 446 outputs a triangular wave R with the same frequency as the pattern clock.

A comparator 447 compares the analog image signal L with the triangular wave R, and outputs a HIGH pulse width modulation signal S when the analog image signal L is greater than the triangular wave R. The pulse width modulation signal S is input to the laser drive circuit, which is not shown in the figures. When the pulse width modulation signal S is HIGH, the laser drive circuit drives the semiconductor laser.

A quinary counter 448 counts the beam detect signal N, and outputs a value from 0–4 over output buses V1–V3 to a selector control circuit 449. Based on the V1–V3 values input from the quinary counter 448, the selector control circuit 449 outputs a selector control signal T causing the selector 445 to select the appropriate pattern clock. The pattern clocks Q1–Q5 selected by the selector 445 for the quinary counter 448 output values V1–V3 are shown in Table 4 below.

TABLE 4

| Counter value | Selected signal |
| --- | --- |
| 0 | Q1 |
| 1 | Q2 |
| 2 | Q3 |
| 3 | Q4 |
| 4 | Q5 |

Figure 12:
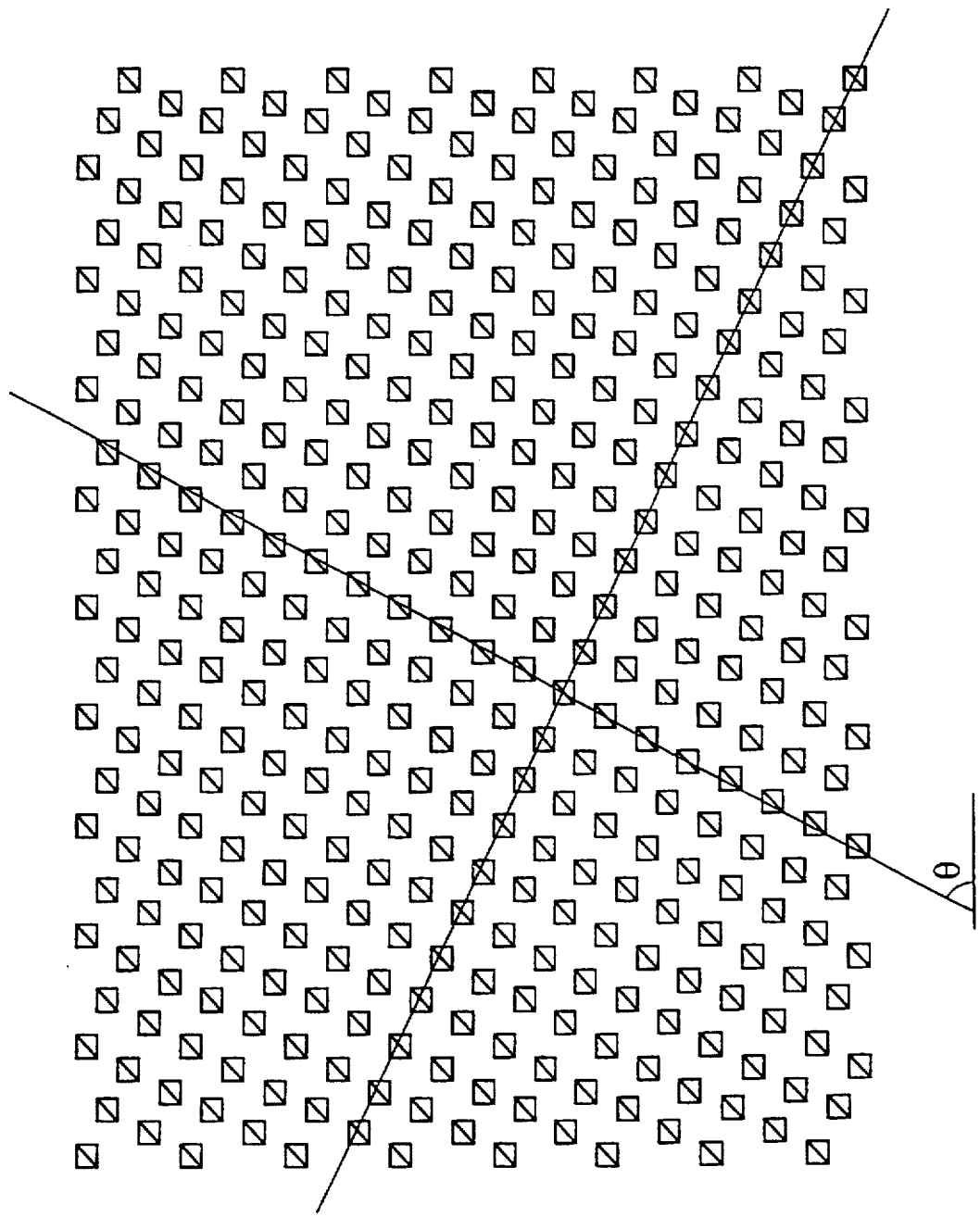
FIG. 12 is an illustration of the formed image when the value of all digital image signals of the invention is 50.

FIG. 12 is an illustration of the formed image when the value of all digital image signals in an image forming apparatus according to the third or fourth embodiment of the invention is 50. As will be understood from FIG. 12, the image forming apparatus of these embodiments uses a 63.435° screen angle in screen processing. The present embodiment is shown for tan 63.435°=2, but screen processing is possible by changing the phase of the pattern signal for the screen angle θ where tan θ is a rational number.

For example, where $\tan^{-1}(\frac{1}{2})=26.565°$, the pattern signal period is equivalent to $(1^2+2^2)=5$ pixels, and screen processing is thus made possible for a 26.565° screen angle by delaying the triangular wave phase for every line equivalent to 3 pixels.

Where $\tan^{-1}(\frac{1}{3})=18.345°$, the pattern signal frequency is equivalent to $(1^2+3^2)=10$ pixels, and screen processing is thus made possible for an 18.345° screen angle by delaying the triangular wave phase for every line equivalent to 7 pixels.

Figure 13:
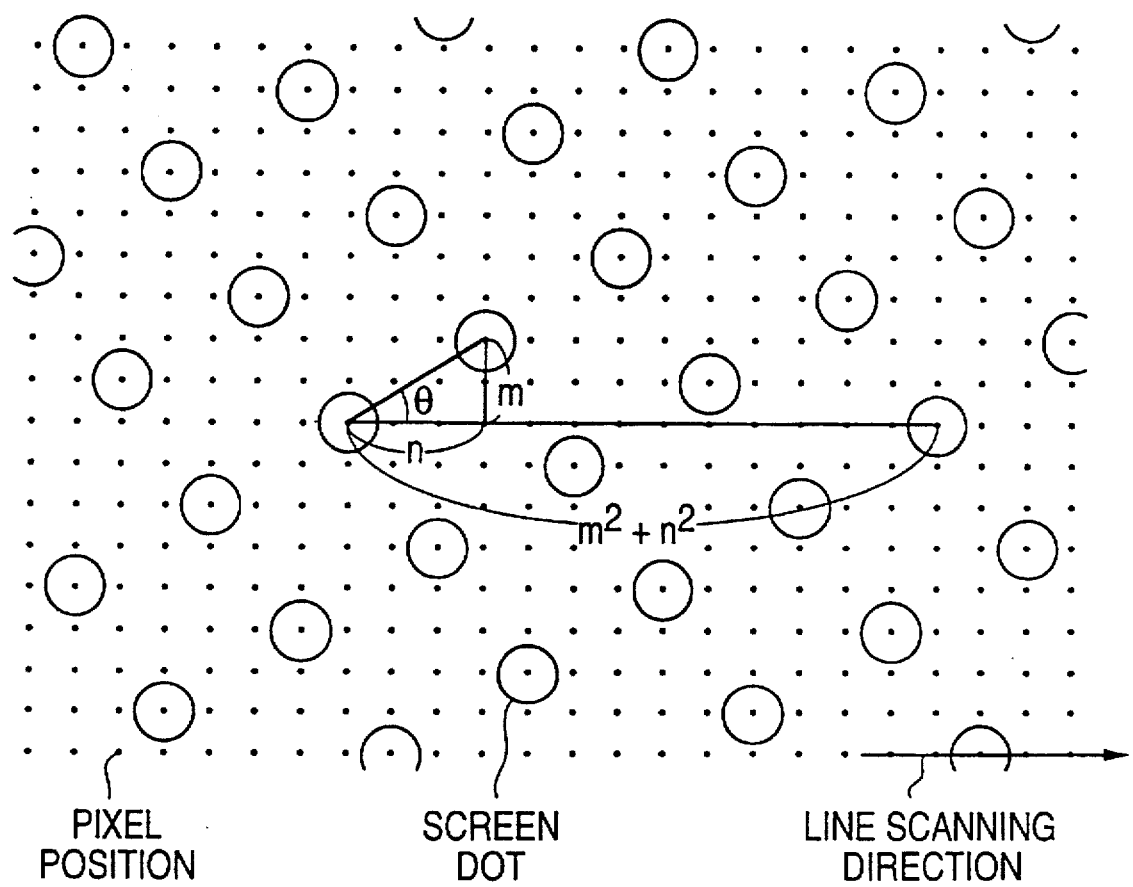
FIG. 13 is an enlarged diagram of screen dots for explaining a period of screen dots on a scan line.
Figure 14:
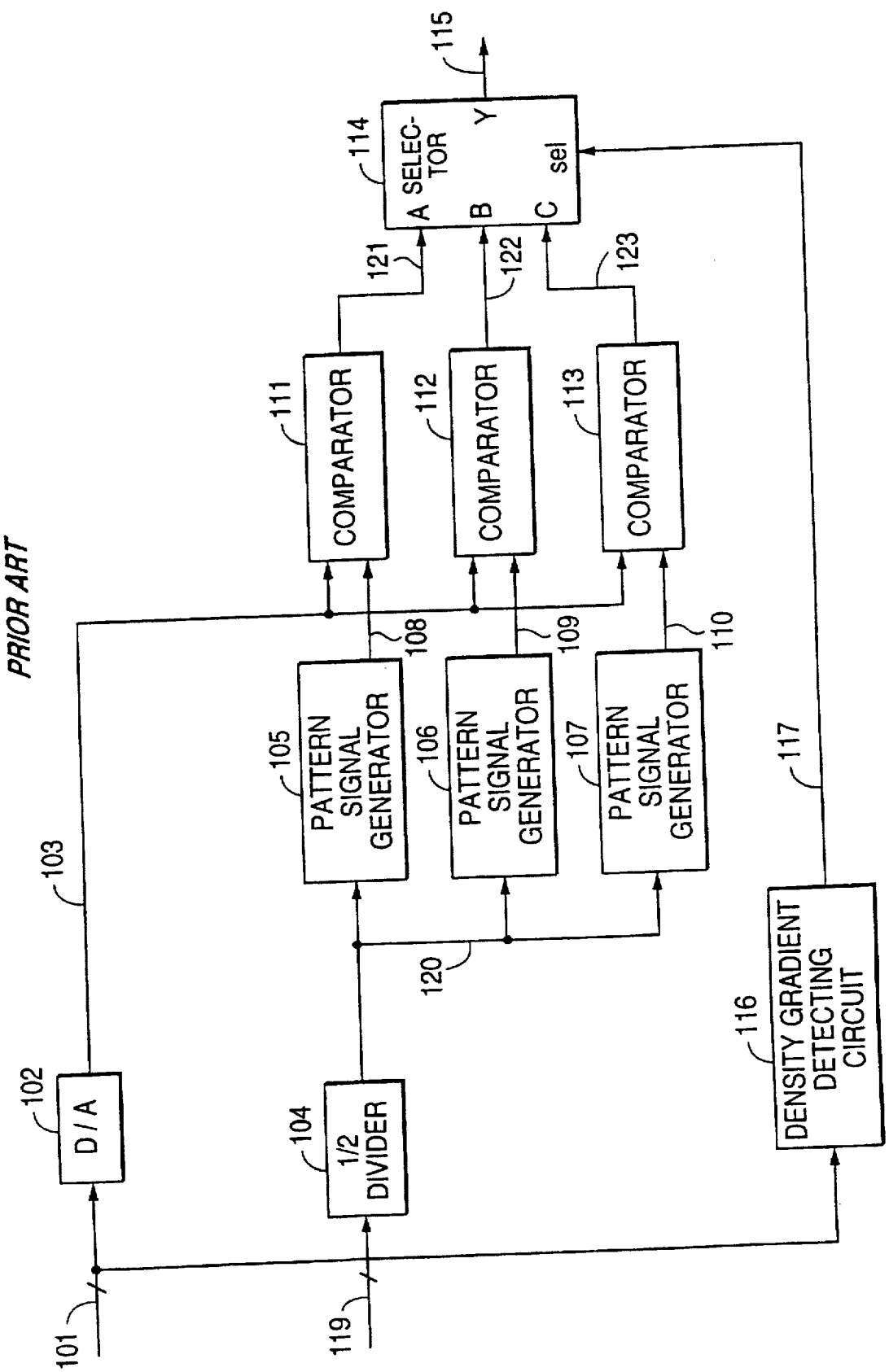
FIG. 14 is a block diagram of a conventional pulse width modulation circuit.
Figure 15:
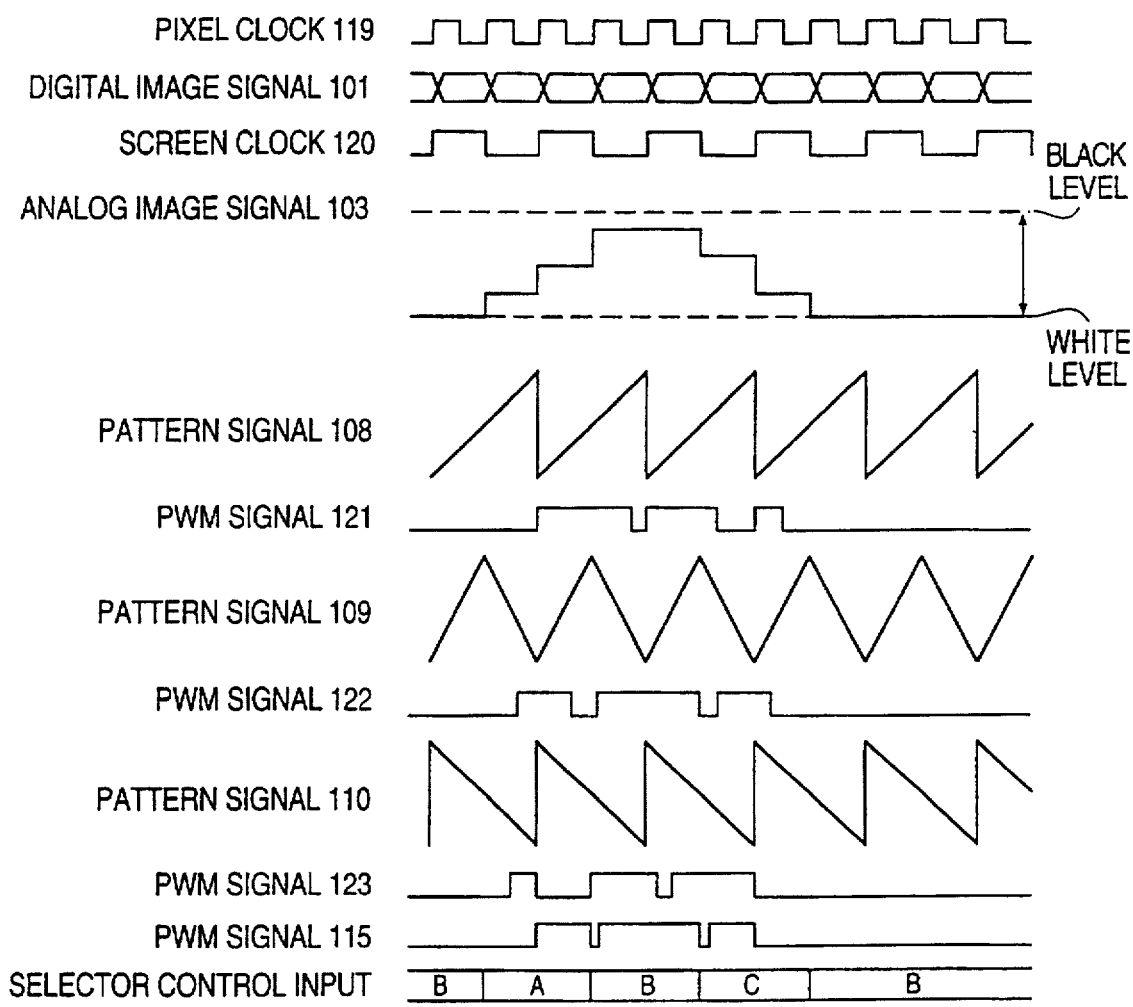
FIG. 15 is a timing chart of the conventional pulse width modulation circuit shown in FIG. 14.

FIG. 13 shows an example of the screen processing with a screen angle θ where tan θ is a rational number ⅔. In this case, the screen dot period in a line scanning direction is 13 pixels (=$2^2+3^2$), as is easily understood from the geometric relation shown in FIG. 13. Generally, in the screen processing with a screen angle θ where tan θ is a rational number represented by m/n (m and n are integers), the screen dot period is equal to $(m^2+n^2)$ pixels. Accordingly, the period of the triangular wave is to be set equal to $(m^2+n^2)$ pixels.

Also, it is to be noted that a position of one screen dot on a scanning line is equivalent to that on the scanning line locating $(m^2+n^2)$ lines after when counted from that line. Accordingly, triangular waves equal to a number $(m^2+n^2)$ which have phases different from each other are needed. Further, the phase of each triangular wave has to be shifted for every line by $360°\times i/(m^2+n^2)$ wherein i is an integer since the position of a screen dot on a scanning line is shifted by the same pixel number between scanning lines.

As described hereinabove, by controlling the screen angle, the screen can be made visually inconspicuous, the screen processing required for color imaging can be applied, and screen processing at the various screen angles required for different color imaging effects can be applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus for forming half tone images by pulse width modulating multi-valued image signals sampled in both horizontal and vertical directions, comprising:

a pattern signal generator for generating $(m^2+n^2)$ pattern signals, each having an equal frequency corresponding to $(m^2+n^2)$ pixels where m and n are positive integers excluding zero and a same wave-shape but being shifted in the phase by $[\{(m^2+n^2)-(m+n)\}/(m^2+n^2)]\times 360°$;

$(m^2+n^2)$ pulse width modulation means for pulse width modulating the image signal based on $(m^2+n^2)$ pattern signals and outputting $(m^2+n^2)$ pulse width modulation signals, respectively;

a selector for selecting and outputting one of $(m^2+n)$ pulse width modulation signals;

a selector control means for controlling said selector for every scan line so that said selector selects $(m^2+n^2)$ pulse width modulation signals cyclically whereby half tone images are formed with a right-angled screen having a screen angle θ of which tan θ is equal to a rational number defined by m/n.

2. An image forming apparatus for forming half tone images by pulse width modulating multi-valued image signals sampled in both horizontal and vertical directions, comprising:

a clock signal generator for generating $(m^2+n^2)$ clock signal, where m and n are positive integers excluding zero, each having an equal frequency corresponding to $(m^2+n^2)$ pixels and a same wave-shape but being shifted in the phase thereof by $[\{(m^2+n^2)-(m+n)\}/(m^2+n^2)]\times 360°$;

a selector for selecting and outputting one of $(m^2+n^2)$ clock signals;

a selector control means for controlling said selector for every scan line so that said selector selects one of $(m^2+n^2)$ pulse width modulation signals cyclically;

a pattern signal generator for generating a pattern signal based on the one of $(m^2+n)$ clock signals selected by said selector; and a pulse width modulation means for pulse width modulating an image signal with the pattern signal and outputting a pulse width modulation signal, whereby half tone images are formed with a right-angled screen having a screen angle θ of which tan θ is equal to a rational number defined by m/n.

3. An image forming method for forming half tone images by pulse width modulating multi-valued image signals sampled in both horizontal and vertical directions, comprising steps of:

generating $(m^2+n^2)$ pattern signals, each having an equal frequency corresponding to $(m^2+n^2)$ pixels where m and n are positive integers excluding zero and a same wave-shape but being shifted in the phase thereof by $[\{(m^2+n^2)-(m+n)\}/(m^2+n^2)]\times 360°$;

pulse width modulating an image signal with $(m^2+n^2)$ pattern signals to generate $(m^2+n^2)$ pulse width modulation signals; and cyclically selecting one of $(m^2+n^2)$ pulse width modulated signals for every scan line, whereby half tone images are formed with a right-angled screen having a screen angle θ of which tan θ is equal to a rational number defined by m/n.

4. An image forming method for forming half tone images by pulse width modulating multi-valued image signals sampled in both horizontal and vertical directions, comprising steps of:

generating $(m^2+n^2)$ clock signals, each having an equal frequency corresponding $(m^2+n^2)$ pixels where m and n are positive integers excluding zero and a same wave-shape but being shifted in the phase thereof by $[\{(m^2+n^2)-(m+n)\}/(m^2+n^2)]\times 360°$;

cyclically selecting one of $(m^2+n)$ clock signals for every scan line;

generating a pattern signal based on the one of $(m^2+n^2)$ clock signals; and pulse width modulating an image signal with the pattern signal generated and outputting a pulse width modulation signal, whereby half tone images are formed with a right-angled screen having a screen angle θ of which tan θ is equal to a rational number defined by m/n.

* * * * *

UNITED STATES PATENT AND TRADEMARK OFFICE
CERTIFICATE OF CORRECTION

PATENT NO. : 5,739,842
DATED : April 14, 1998
INVENTOR(S) : Kazuyuki MURATA

It is certified that error appears in the above-identified patent and that said Letters Patent is hereby corrected as shown below:

Col. 11, line 38, change "$(m^2+n)$ to --$(m^2+n^2)$--.

Col 12, line 8, change "$(m^2+n)$ to --$(m^2+n^2)$--.

Signed and Sealed this

Fifteenth Day of September, 1998

Attest:

BRUCE LEHMAN

Attesting Officer     Commissioner of Patents and Trademarks